United States Patent [19]

Sauer

[11] 4,046,009

[45] Sept. 6, 1977

[54] THERMOCOUPLE FOR CONTINUOUSLY MEASURING THE TEMPERATURE ALONG THE LENGTH OF A SURFACE

[75] Inventor: Charles A. Sauer, Belleville, Ill.

[73] Assignee: Swiss Aluminium Ltd., Chippis, Switzerland

[21] Appl. No.: 679,770

[22] Filed: Apr. 23, 1976

[51] Int. Cl.² .......................... G01K 7/08; G01K 1/14
[52] U.S. Cl. ................................ 73/359 R; 73/343 R; 73/351
[58] Field of Search ...................... 73/343 R, 351, 359; 72/13, 33

[56] References Cited

U.S. PATENT DOCUMENTS

| | | | |
|---|---|---|---|
| 2,279,846 | 4/1942 | Stapleton | 73/343 R X |
| 2,694,313 | 11/1954 | Nieman | 73/351 |
| 2,991,654 | 7/1961 | Englehard | 73/359 |
| 3,155,237 | 11/1964 | Mai | 73/359 X |
| 3,266,314 | 8/1966 | West | 73/359 |
| 3,540,280 | 11/1970 | Shoenlaub | 73/343 R |

*Primary Examiner*—Richard C. Queisser
*Assistant Examiner*—John S. Appleman
*Attorney, Agent, or Firm*—Robert A. Dawson; Robert H. Bachman

[57] ABSTRACT

An apparatus for measuring the temperature along the surface of an object is disclosed which incorporates a mounting unit placed on wheels which run along a non-moving surface or which rotate against a moving surface. The mounting means contains dissimilar metal ribbons pivotally mounted to spring loaded non-conductive strips. The electromotive force generated by the dissimilar ribbons in a junction with the surface to be measured drives indicators on temperature indicating devices.

10 Claims, 2 Drawing Figures

THERMOCOUPLE FOR CONTINUOUSLY MEASURING THE TEMPERATURE ALONG THE LENGTH OF A SURFACE

BACKGROUND OF THE INVENTION

One problem which has been encountered in measuring the temperature of continuously moving surfaces is that conventional thermocouple measuring devices either cannot accurately measure the temperature of the moving surfaces or the thermocouple can only measure one particular point on the surfaces. This problem is enhanced in the extrusion of various materials, particularly the extrusion of metals. In the extrusion of materials, it is very desirable to maintain an extrusion temperature within a definite range which is below the lowest melting point of any component of the extruded material. This is particularly true in the extrusion of metal alloys, where there may be many components of each alloy, each component with its own melting point, so that the preferred extrusion temperature requires careful calculation and careful control of the extrusion apparatus.

One manner of measuring extrusion temperatures has been to insert a static thermocouple in the extrusion die itself. In some instances, the thermocouple is inserted in a hole which is drilled through the die so that the sensitive thermocouple end is in the same position as in one surface of the die. Therefore, the thermocouple is in actual contact with the extrusion material and measures the temperature of the material as it flows through the die. One of the problems with this arrangement is the difficulty in placing the thermocouple lead wires through the die holder and other tooling arrangements to an indicating device. The susceptibility of mechanical damage to these lead wires is extremely high and if the wires are pinched and shorted, the whole die assembly has to be taken apart for replacement of the measuring device. This arrangement utilizes a thermocouple of conventional design, i.e., two dissimilar metals welded together to form the heat-sensitive junction which then contacts the surface to be measured.

Another manner of measuring material which has been extruded through a die is that found in, for example, U.S. Pat. No. 3,155,237. This patent teaches an arrangement of thermocouple members placed a distance away from the die surface. The material being extruded must be electrically conductive since it forms part of the thermocouple junction, which generates the electromotive force necessary to move an indicator on a temperature dial. The thermocouple members are a pair of gripping tongs which grip the extruded material at an end distant from the face of the extrusion die. These gripping tongs contact the surface of the extruded material at this distant point to avoid damaging the surface of the extruded material adjacent to the die face. A problem which this approach engenders is the cooling of the extruded material between the die face and the distant point where the thermocouple tongs grip the extrusion. This approach will also indicate only the average temperature of the two points where the tongs are in contact with the surface. For example, if the temperature is 500° F at one contact point and 600° F at the other contact point, a temperature of 550° F will be indicated.

It is, therefore, a principal object of the present invention to provide an apparatus which can accurately measure the temperature of continuously moving surfaces and which can accurately measure the temperature along the length of a stationary surface.

It is a further object of the present invention to provide a means for accurately measuring the temperature of continuously moving surfaces or along the length of stationary surfaces without scratching or otherwise harming said surfaces.

It is still a further object of the present invention to provide a thermocouple means for accurately measuring the temperature of continuously moving surfaces or along the length of stationary surfaces which can be easily constructed and readily produced without great expense.

It is a still further object of the present invention to provide a thermocouple means for accurately measuring the temperature of extruded surfaces, whose physical size is small enough to enable the means to be positioned at the extrusion die exit.

SUMMARY OF THE INVENTION

The apparatus of the present invention comprises a mounting which rolls on wheels along the length of the surface to be measured. The mounting supports two pieces of non-conducting material, each of which is spring loaded on a pivot. Pieces of metal ribbon are attached to the pieces of non-conducting material. The metal ribbons are composed of two different materials, which along with a third conducting surface being measured, comprise a thermocouple. Each piece of ribbon should be long enough to be securely fastened to the non-conducting material in the mounting and should project beyond the plane of the bottom of the wheels attached to the mounting. This projection of the metal ribbons beyond the wheel plane occurs when the springs are in the relaxed position.

When this mounting is placed on a relatively flat surface, the metal ribbons are pushed upward into the mounting until the wheels come into contact with the surface. In this position, the springs are placed in tension and enough pressure is applied to the ribbons in contact with the surface to ensure an adequate connection of the ribbons to the surface.

The metal ribbons are comprised of dissimilar metals and form an electromotive force when the metals are joined together and the resulting junction is heated. This concept is quite well known in the art of pyrometry. In the means of the present invention, two junctions are formed, one in which one ribbon is positive with respect to the moving surface and one in which the other ribbon is negative with respect to the moving surface. This difference results in an electromotive force which is the same as would be generated by a junction of the ribbons. Lead wires from the ribbons to a suitable indicating or recording instrument complete the measuring circuit.

DETAILED DESCRIPTION

Figure 1:
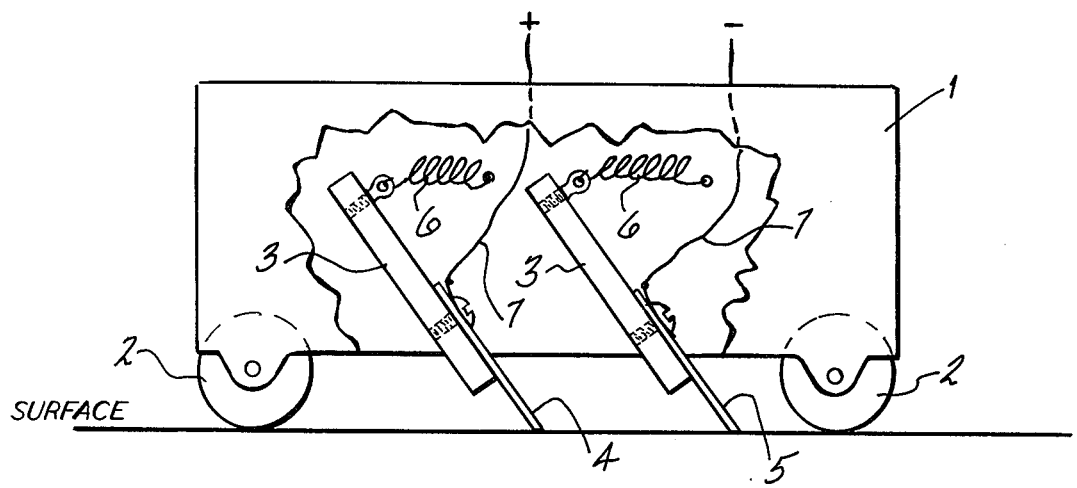
FIG. 1 is a broken section side view of the thermocouple means of the present invention.

The general principle of the present invention may perhaps be best understood by considering initially the thermocouple means of FIG. 1. FIG. 1 is a partially broken side view of mounting means 1 to which are attached several wheels 2, said wheels being suitable for contacting the surface to be measured, and which are free to rotate about axles which are mounted to means 1. Pivotally secured within mounting means 1 are strips of non-conductive material 3, each of which support metal ribbons 4, 5, which are dissimilar. The non-conductive strips are connected near the end opposite to the metal ribbon anchoring points to tension spring means 6 which are in turn secured to mounting means 1. Lead wires 7 run from the ribbon mounting means to temperature indicating instruments which are not shown.

In operation, mounting means 1 is placed against a moving surface to be measured so that metal ribbons 4 and 5 contact said surface and the pressure of said contact forces ribbons 4 and 5 upwardly towards mounting means 1. The non-conductive strips 3 are forced by the upward movement of the metal ribbons to turn about their pivot points, thus placing tension on springs 6. The upward movement of the metal ribbons forces wheels 2 against the surface length, to thus rotate free along with movement along the surface. The electromotive force generated by the metal ribbons, one of which is electrically positive with respect to the surface length and the other of which is electrically negative with respect to the surface length, travels through wires 7 to indicating instruments (not shown) which register the temperature as measured by the thermocouple.

Figure 2:
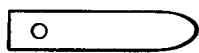
FIG. 2 is a front view of one of the measuring metal ribbon elements.

FIG. 2, is a front view of one of the measuring metal ribbon elements. This element is provided with a hole near one end and a rounded portion at the opposite end of the ribbon. This rounded end, while not critical in configuration, provides a surface in which the unit pressure upon the surface to be measured is low enough so that the measured surface is not marred while establishing adequate electrical contact with the measured surface. At the same time, such a configuration does not present a mass of metal which cannot come to the true temperature of the measured surface due to heat transfer losses to the rest of the ribbon.

The preferred form of the thermocouple means presented by the present invention comprises a mounting which rolls on two unglazed porcelain wheels. The mounting supports two pieces of non-conducting material, such as bakelite, which are spring loaded on pivot points. Pieces of metal ribbon preferably 0.250 inch wide by 0.010 inch thick are attached to the bakelite. Various materials may be utilized for the metal ribbons. Particularly preferred are metal ribbons of Chromel and Alumel. This combination of known thermocouple elements may be utilized in measuring surfaces up to approximately 1400° C. Other known thermocouple metals may also be used as the metal ribbon elements. Metal combinations such as copper-constantan and iron-constantan may be utilized for measuring surfaces up to approximately 400° C and 800° C, respectively. Other known thermocouple metals and other elements may be utilized, depending upon the maximum temperature of the surface which is to be measured. The metal ribbons should be long enough to be securely fastened to the non-conducting material and also project about ⅛ to 3/16 inch beyond the plane of the bottom of the wheels when the springs are in a relaxed position.

The preferred arrangement of metal ribbons within the mounting means is, as shown by FIG. 1, one ribbon behind the other. In this form, the overall width of the mounting is about ½ inch. Measured surfaces having a major width dimension of approximately ⅜ inch can thus easily be measured for temperature using this mounting arrangement. An alternative mounting may have the thermocouple ribbons placed side by side. This mounting may measure wider object surfaces or the ribbons may be placed in a curved mounting which may be used for measuring the temperature of smooth tubes and other cylindrical objects. In this form, the thermocouple ribbons should be arranged approximately 120° apart.

While the following examples display the use of the thermocouple means of the present invention on metal extrusion forms, the means for measuring the surface temperature of these extrusions may also be used for measuring the temperature of any flat or curved object. Of course, such an object should be heated to within the measuring range of the thermocouple elements enclosed within the mounting means. The means of the present invention may be best utilized, when measuring items which have not been freshly extruded, as a way of determining the surface temperature of the object throughout the length of the object.

The advantages of the present invention may be more readily appreciated from a consideration of the following examples.

EXAMPLE I

The slider thermocouple of the present invention was utilized to measure the temperature of various shaped aluminum extrusions. These tests were in the range of 800° to 900° F (426.7° to 482.2° C) at speeds from static state to approximately 10 feet per minute. This speed was the maximum speed being extruded and was not a limitation of the slider thermocouple. In all the tests, the temperature response of the slider thermocouple was instantaneous, being limited only by the period of the instrument used to read the thermocouple output. The slider thermocouple should be operative in measuring temperatures at object speeds of 50 feet per minute or more.

EXAMPLE II

The slider thermocouple of the present invention was utilized in measuring the surface temperature of a metal test block which was heated in an oven. A thermocouple composed of an iron-constantan junction was peened into the surface of the test block and connected to an indicating device as a comparison with the output obtained by the slider thermocouple. The results are shown in Tables Ia and Ib.

TABLE Ia

| Comparison of Slider Thermocouple and Static Block In the Range of 400-650° F | | |
|---|---|---|
| Static Block Temp., ° F | Slider Thermocouple Temp., ° F | Slider Thermocouple Temp., ° F, Deviation |
| 400 | 410 | +10 |
| 425 | 430 | +5 |
| 450 | 450 | 0 |
| 475 | 475 | 0 |
| 500 | 485 | −15 |
| 525 | 515 | −10 |
| 550 | 555 | +5 |
| 575 | 575 | 0 |
| 600 | 595 | −5 |
| 625 | 620 | −5 |
| 640 | 640 | 0 |
| 650 | 650 | 0 |

TABLE Ib

Comparison of Slider Thermocouple and Static Block
In the Range of 650–840° F

| Static Block Temp., ° F | Slider Thermocouple Temp., ° F | Slider Thermocouple Temp., ° F, Deviation |
| --- | --- | --- |
| 650 | 650 | 0 |
| 700 | 700 | 0 |
| 700 | 705 | +5 |
| 705 | 710 | +5 |
| 800 | 820 | +20 |
| 810 | 820 | +10 |
| 830 | 830 | 0 |
| 830 | 820 | −10 |
| 840 | 825 | −15 |

As can be seen from the tables presented above, the slider thermocouple of the present invention is at least as accurate as known thermocouple devices.

EXAMPLE III

The slider thermocouple of the present invention was utilized to measure the surface temperature of a test block and was compared to a standard probe-type thermocouple. The results of the comparison are shown in Table II.

TABLE II

Comparison Of Slider Thermocouple and Probe-Type Thermocouple In the Range of 410–700° F

| Probe-Type Thermocouple Temp., ° F | Slider Thermocouple Temp., ° F | Slider Thermocouple Temp., ° F, Deviation |
| --- | --- | --- |
| 410 | 400 | −10 |
| 420 | 420 | 0 |
| 430 | 425 | −5 |
| 440 | 435 | −5 |
| 475 | 480 | +5 |
| 500 | 500 | 0 |
| 530 | 525 | −5 |
| 535 | 530 | −5 |
| 610 | 615 | +5 |
| 620 | 625 | +5 |
| 630 | 635 | +5 |
| 660 | 650 | −10 |
| 670 | 670 | 0 |
| 675 | 685 | +10 |
| 700 | 700 | 0 |

As can be seen from the table presented above, the slider thermocouple of the present invention is at least as accurate as a standard probe-type thermocouple.

EXAMPLE IV

The thermocouple of the present invention was utilized to continuously measure the surface temperature of extruded material. Any markings which were detected on the surface of the extruded material after the measuring station were inspected by a quality control inspector. Since all structural extrusions have at least some markings referred to as "die marks," the test of excessive marking by the thermocouple of the present invention would be that any marks made by said thermocouple would be more visible than any marks made by the extrusion die. Since these tests were made on aluminum and aluminum alloy extrusions, the tolerances for surface roughness of the extruded material were taken from the standard tolerances published by The Aluminum Association (from Aluminum Standards & Data, third edition, 1972). From these tolerances, the allowable depth of surface defects, in inches, may range from 0.0015 to 0.008 for respective section thicknesses, in inches, of up through 0.063 to greater than 0.501 for wire, rod, bar and shapes extruded through a die. On all of the tests, no markings could be visually detected that were attributable to the thermocouple of the present invention. Any markings which were detected were attributed to the extrusion die and normal handling of the extruded material. Therefore, the thermocouple of the present invention can provide an effective way of measuring the surface temperature of material which would be detrimentally marked by ordinary thermocouple devices. This, in combination with the accuracy as shown in the preceding examples, renders the thermocouple of the present invention a most useful tool for measuring the surface temperature along the length of many materials.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for measuring the temperature along the length of a surface comprising, in combination, mounting means for mounting the temperature measuring components; several wheels being suitable for contacting the surface to be measured, said wheels being free to rotate about axles which are attached to one end surface of said mounting means; several strips of non-conductive material privotally and separately secured within said mounting means; said temperature measuring components including metal ribbons, which are dissimilar in the manner that at least one of said ribbons is electrically positive with respect to the surface and at least one of the other ribbons is electrically negative with respect to said surface, mounted with securing means adjacent one end of each strip of non-conductive material, provided that the metal ribbons are all placed in the same direction away from the pivot points; tension spring means connected adjacent the ends of the non-conductive strips opposite to the ends supporting said metal ribbons, the ends of said spring means not connected to said non-conductive strips being secured to said mounting means; said metal ribbons projecting below the plane of the bottom of said wheels when said spring means are in a relaxed position; and lead wires connected to the securing means for each metal ribbon, said wires running from said securing means to temperature indicating instruments.

2. An apparatus as in claim 1 wherein said wheels are in the same plane, said plane being parallel to the plane formed by those portions of said metal ribbons which contact said surface.

3. An apparatus as in claim 2 wherein said wheels are in a curved plane.

4. An apparatus as in claim 3 wherein said metal ribbons are placed in a curved plane.

5. An apparatus as in claim 1 wherein said metal ribbons are secured within said mounting means so that the major face of each ribbon lies in a plane which is different from but parallel to the plane containing the major face of each other ribbon.

6. An apparatus as in claim 1 wherein said metal ribbons are secured within said mounting means so that the major face of each ribbon lies in the same plane.

7. An apparatus as in claim 1 wherein the ends of said metal ribbons contacting the surface to be measured are rounded off.

8. An apparatus for measuring the temperature along the length of a continuously moving extrusion surface during the extrusion process comprising, in combination, extrusion means for extruding an electrically conductive extrusion material, said extrusion means including a die having an orifice, said die having at least one outlet end through which the extrusion material flows to form an extrusion; mounting means for mounting the temperature measuring components which measure the surface temperature of said extruded material during the extrusion process; several wheels being suitable for contacting the surface to be measured, said wheels being free to rotate about axles which are attached to one end surface of said mounting means during the extrusion process; several strips of non-conductive material pivotally and separately secured within said mounting means; said temperature measuring components including metal ribbons, which are dissimilar in the manner that at least one of said ribbons is electrically positive with respect to the surface and at least one of the other ribbons is electrically negative with respect to said surface, mounted with securing means adjacent one end of each strip of non-conductive material, provided that the metal ribbons are all placed in the same direction away from the pivot points, said metal ribbons contacting said extruded material to form an electrical connection; tension spring means connected adjacent the ends of the non-conductive strips opposite to the ends supporting said metal ribbons, the ends of said spring means not connected to said non-conductive strips being secured to said mounting means; said metal ribbons projecting below the plane of the bottom of said wheels when said spring means are in a relaxed position; and lead wires connected to the securing means for each metal ribbon, said wires running from said securing means to temperature indicating instruments; the electrical junction formed by the metal ribbons contacting the electrically conductive extrusion material generating an electromotive force through said lead wires to operate said temperature indicating instruments.

9. A method of determining the surface temperature along the length of an object comprising:
A. providing a temperature measuring device comprising, in combination, mounting means for mounting the temperature measuring components; several wheels being suitable for contacting the surface to be measured, said wheels being free to rotate about axles which are attached to one end surface of said mounting means; several strips of non-conductive material pivotally secured within said mounting means; said temperature measuring components including metal ribbons, which are dissimilar in the manner that at least one of said ribbons is electrically positive with respect to the surface and at least one of the other ribbons is electrically negative with respect to said surface, mounted with securing means adjacent one end of each strip of non-conductive material, provided that the metal ribbons are all placed in the same direction away from the pivot points; tension spring means connected adjacent the ends of the non-conductive strips opposite to the ends supporting said metal ribbons, the ends of said spring means not connected to said non-conductive strips being secured to said mounting means; said metal ribbons projecting below the plane of the bottom of said wheels when said spring means are in a relaxed position; and lead wires connected to the securing means for each metal ribbon, said wires running from said securing means to temperature indicating instruments;
B. placing said temperature measuring device against the surface to be measured so that the wheels contact said surface and said metal ribbons are forced upwards towards the mounting means, thus forcing said non-conductive material about the pivot points and placing said spring means in tension;
C. moving said measuring device along the object surface using said wheels; and
D. continuously monitoring said temperature indicated on said indicating instruments as the measuring device rolls along the surface.

10. A method as in claim 9 wherein step C comprises moving said object such that said movement causes rotation of the wheels on said measuring device which contact the object.

* * * * *